Dec. 14, 1965 V. N. TRAMONTINI 3,223,150
HEAT EXCHANGER

Original Filed June 2, 1961 2 Sheets-Sheet 1

INVENTOR
Vernon N. Tramontini

By *William J. Newman*
Attorney

Dec. 14, 1965
V. N. TRAMONTINI
3,223,150
HEAT EXCHANGER
Original Filed June 2, 1961
2 Sheets-Sheet 2
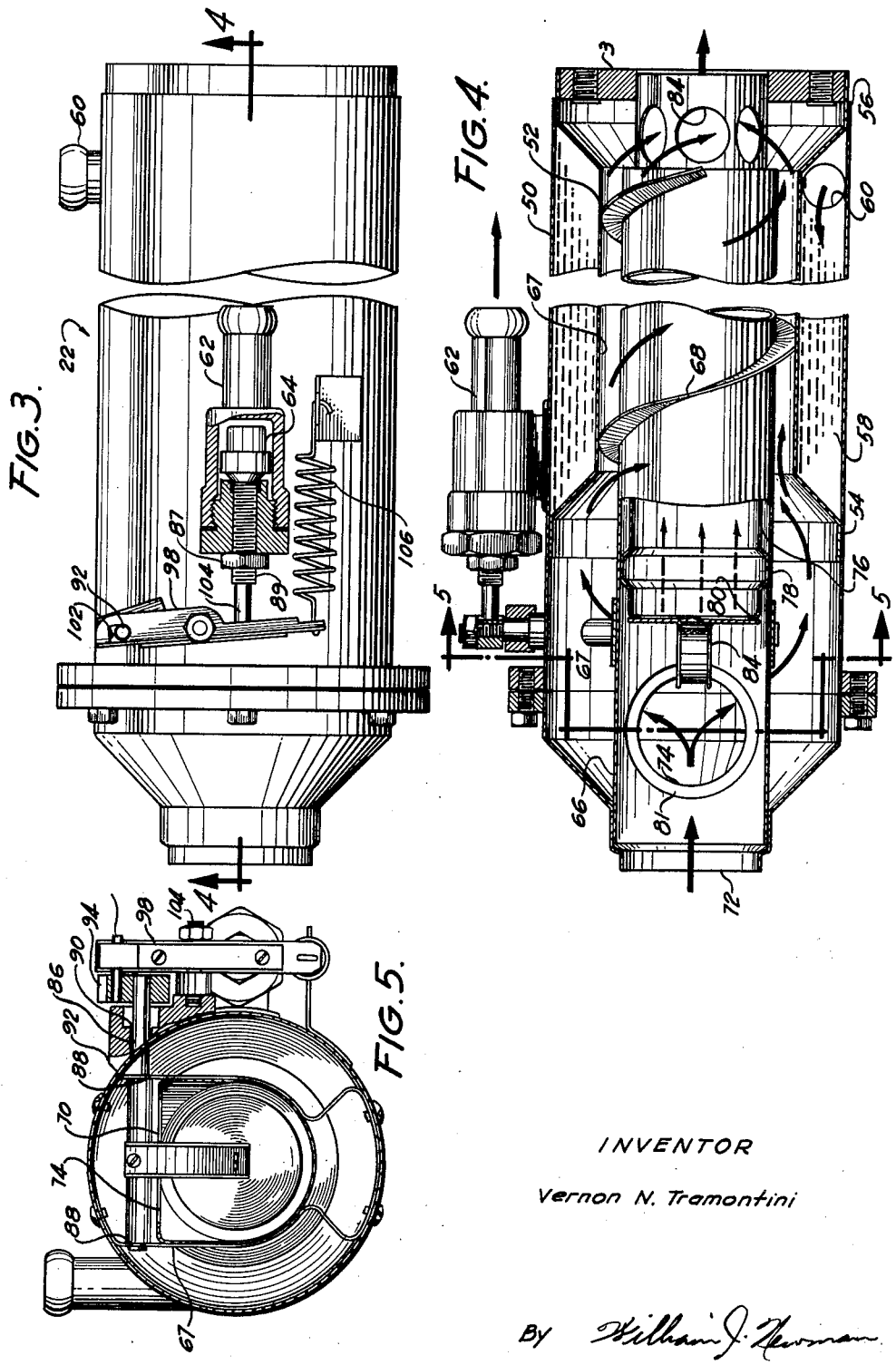
INVENTOR
Vernon N. Tramontini
By *William J. Newman*
Attorney

United States Patent Office 3,223,150
Patented Dec. 14, 1965

3,223,150
HEAT EXCHANGER
Vernon N. Tramontini, Indianapolis, Ind., assignor to Stewart-Warner Corporation, Chiacgo, Ill., a corporation of Virginia
Original application June 2, 1961, Ser. No. 114,501. Divided and this application Mar. 19, 1962, Ser. No. 181,237
1 Claim. (Cl. 165—34)

This application is a division of application Serial No. 114,501, filed June 2, 1961, now abandoned.

This invention relates to heating apparatus and is more particularly concerned with, but not limited to, heating equipment for automobiles and similar vehicles.

In present automotive practice the passenger compartment of a vehicle is frequently heated by means of a liquid coolant radiator to which engine heat is transferred in some manner and distributed by air passing into the vehicle body. In automobiles having water cooled engines the radiator is most frequently connected to the engine cooling system so as to receive a supply of hot water from the water jacket of the internal combustion engine.

With this type of arrangement the radiator unit is ineffective until the temperature of the water in the jacket of the engine has been raised by operation of the engine itself. When the vehicle has been standing in the open or in an unheated garage for an appreciable length of time in cold weather, the water in the engine cooling system is at a low temperature and some little time is required to bring the water to a sufficiently high temperature to enable the radiator units to function. Most automobile cooling systems include thermostatic controls which prevent some or all of the cooling water from circulating through the automobile cooling radiator until the temperature in the water jacket has reached a predetermined minimum value. The thermostatic control shortens the time required to bring the engine itself to normal operating condition and also the time required to raise the water in the circulatory system to a sufficiently high temperature so that the radiating unit for the vehicle body will begin to give off heat to the passenger compartment. However, even with the best present installations a very appreciable period of time is required before the engine water warms sufficiently to commence supplying heat to the passenger compartment heater if the automobile and its cooling system are thoroughly chilled at the time the engine is started.

One object of this invention is to provide auxiliary apparatus for use with a water circulatory system having one or more heat radiating units and which will materially shorten the time required to bring the liquid or water coolant in the system to a sufficiently high temperature to enable the radiating units to give off heat.

Another object of this invention is to provide a novel preheater unit which is especially adapted for use with a system of the type hereinbefore described. A heat exchanger unit is provided in which the heat from the exhaust gases is transferred to the radiator liquid coolant medium. A by-pass conduit is also provided through the unit which is rendered effective by a thermostatically controlled valve means to shunt the gases around the heat transfer means when the liquid coolant attains a sufficient temperature level. The by-pass is constructed to present a minimum resistance to gas flow so that the preheater unit does not materially affect the operating efficiency of the engine during normal operating conditions.

It is also an object of this invention to provide a preheater unit which may be economically fabricated and easily installed in existing heating systems.

Other objects and advantages of this invention will become readily apparent upon a further reading of this specification, especially when taken in view of the accompanying drawings, in which:

FIG. 3 is an elevation view, partially in section, of one type of heat exchanger which may be used in the system of this invention;

FIG. 4 is a section view of the heat exchanger of FIG. 3 taken along the line 4—4 therein;

FIG. 5 is a section view of the heat exchanger taken along the line 5—5 of FIG. 4.

Figure 1:
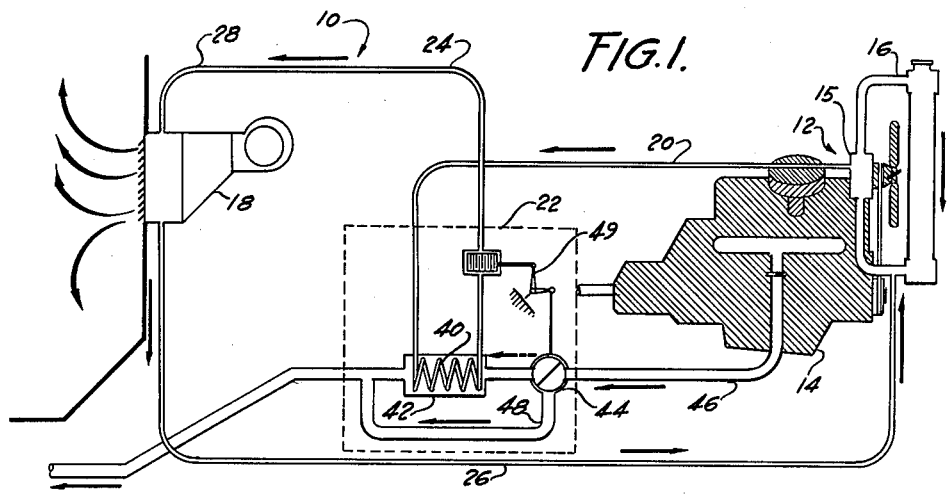
FIG. 1 is a schematic representation of the heating system of this invention as applicable in conjunction with a water cooled engine.

Referring now to FIG. 1, there is shown a heating system 10 in conjunction with a cooling system 12 for a liquid cooled internal combustion engine 14. As is well known, the engine 14 comprises a water pump 15 which circulates water through the engine jacket, as well as through its own radiator system 16, which serves to remove heat from the water by means of air passing therethrough. The radiator system 16 is thermostatically controlled to limit the flow of water through the radiator during warm-up periods in order to provide faster warm-up of the engine coolant water.

Ordinarily the passenger compartment heating system 10 would comprise a radiator unit 18 which is fed directly from the outlet of the water pump. In the system of this invention, however, the water is fed to the radiator unit 18 through heat exchanger 22 by means of conduits 20 and 24. The outlet of the radiator 18 is directly connected to the radiator system 16 at the inlet side of pump 15 by means of conduit 26. A manually adjustable thermostat 28 is provided adjacent the inlet side of the radiator 18 for controlling the temperature of the passenger cabin. The thermostat 28 is adapted to pass a small amount of water even at the lowest temperature setting in order for the proper functioning of the heat exchanger unit 22 as hereinafter described.

The unit 22 generally comprises a passage 40 for the water coolant which is in heat exchange relationship with a passage 42 connected through a valve 44 to the exhaust pipe system 46 of the engine 14. There is also a by-pass 48 to which the valve 44 may direct the exhaust gases in response to the temperature condition sensed by a thermostatic valve actuator mechanism 49.

In the operation of the system, the thermostatic mechanism closes the valve 44 to the by-pass 48 when the engine is cold prior to ignition of the engine 14. Ordinarily, the thermostat in the engine radiator system 16 is also closed, so that, when operation of the engine 14 is initiated, the engine coolant water will circulate through the jacket of the engine 14 and also through the vehicle heater system 10 including the passage 40 in the heat exchanger unit 22 and the radiator 18. All of the exhaust gases passing through the exhaust pipe system 46 will be transmitted through the heat exchanger unit 22 in heat exchange relationship with the coolant water in the passage 40. Since the exhaust gases have a high initial heat content, the water in the passages 40 will absorb some of the heat and transfer it to the vehicle heater 18 where it will be available for heating the passenger compartment. In most installations, however, the radiator 18 will not have sufficient capacity to remove all of the heat added to the coolant water so that the water returned to the engine through conduit 26 will be at a somewhat elevated temperature. The heated coolant water thus returned to the engine will transfer heat to the engine block 14 and reduce the engine warm-up time.

When the coolant water passing through the heater exchanger rises to a predetermined temperature, the thermostatically controlled actuator 49 operates the valve 44 to shunt the exhaust gases to the by-pass 48. It is preferable that the thermostatic unit operate over only a short range of temperatures to actuate the by-pass valve from its one extreme position to the other. It has also been found that for ideal operation in automobile heater applications the by-pass should be fully opened at a temperature approximately 150° F., but, of course, this may be altered depending on desired conditions.

Reference is now made to FIGS. 3 through 5 for a description of one type of heat exchanger unit to be used with the heating system. The unit comprises a cylindrical housing 49, within which is disposed a substantially spool-shaped member 52. The member is sealed to the inner wall of the housing 50 at its two outer peripheral edges 54, 56 to form therewith a substantially annular chamber 58. There is provided an inlet 60 for engine cooling water as well as an outlet 62 which is specially adapted to house a thermostatic actuator device 64 as hereinafter described. A tubular member 66 extends concentrically within the housing 50 and is maintained radially spaced from the annular chamber 58 by means of a mounting bracket 65 and a spiral baffle 68. The baffle also provides a spiral passage 67 for exhaust gases diverted thereto in a manner to be described, to improve the heat transfer between the gases and the coolant water in the annular chamber.

The tubular element 66 has a flattened wall portion 70 at its inlet end 72 (FIG. 5) in which there is an aperture 74 to serve as a passage for exhaust gases from the interior of the tubular element 66 to the spiral passage 67 between its exterior and the annular chamber 58. Within the tubular element 66 is another tubular element 76 having a smaller diameter than the tube 66 and peripheral protuberances 78 to support it therein. The tubular element 66 extends beyond either end of the spool-like member 52 and terminates at its one end within an annular spacer plate 79. An inwardly directed flange 80 at the other end of the tube 76 adjacent the inlet to tube 76 serves as a valve seat for a pivotally mounted valve head 82. This is a second valve seat 81 around the aperture 74 in the wall of the tube 66 with which the pivotally mounted valve head 82 makes engagement in its alternate position. The inlet end of the heat exchanger unit 22 is connected to the exhaust pipe 46 from the engine by suitable adaptor means (not shown) and the outlet end is connected to the vehicle tail pipe (not shown) by a suitable adaptor which is supported by screws to the spacer plate 79.

Thus when the valve head 82 is in the position as shown in FIG. 4, closing the entrance to the tube 76, the exhaust gases from the engine pass into the inlet end of the tubular element 66, through aperture 74 and into the spiral passage 67 between the tube 66 and annular chamber 58 exiting through outlet apertures 83 into the tail pipe. When the valve is in its alternate position, closing aperture 74, the exhaust gases pass straight through the interior of tube 76 which is effectively insulated from the fluid medium in the chamber 58 by the passage 67.

The valve head 82 is loosely riveted to an arm 84 which is connected to, and rotatable with, a shaft 86 journaled between the opposite sides 88 of the mounting bracket 67 and extending through an aperture 90 in a support bracket 92 mounted on the outside of the housing 50. The exterior end of the shaft 86 carries a lever member 94 having a pin 95 extending therefrom. A lever arm 98 rotatable about a pivot 100 attached to the support bracket 92 engages the pin 96 within an enlarged opening 102. The lever arm 98 is actuatable by the linear motion of a pin 104 responsive to the temperature of coolant water in the outlet 62 passing by the thermostatic device 64.

The valve head 82 and its linking mechanism is normally biased by a spring 106 to its position as shown in FIGS. 3 through 5 to close the entrance to the exhaust by-pass through the tubular element 76 so that the exhaust gases will pass through aperture 74 and into the heat transfer passage 67 when the fluid passing through the outlet 62 and around the thermostatic actuator 64 is cool. When the coolant at the outlet 62 reaches the predetermined temperature range, the thermostatic unit 64 causes the pin 104 to extend outward and apply a clockwise rotational force on the lever arm 98, as shown in FIG. 3. The rotational motion is transmitted to the shaft 86 to pivot the valve head 82 from the valve seat 80 to the valve seat 81 in the wall of the tube 66.

It is to be noted that there is a substantial mechanical advantage between the lever arm 98 and the lever member 94 so that a small rotational movement of the arm 98 causes a substantially larger rotational displacement of the member 94 and shaft 86. A nut 87 in engagement with a threaded portion 89 on the pin 104 provides an adjustment of the length of the arc of rotation of the valve head 82.

A suitable actuator which may be used as the thermostatic device 64 is a Detroit Controls Co. Model XEV–12049 Vernatherm which has a pin stroke of .250" and a rated operating temperature range of 162° to 175° F. The dimensions of the lever arm 98 and lever member 94 are suitably selected to impart a rotational displacement of approximately 90° to the pivot arm 84 and valve head 82 responsive to a ¼" stroke of the pin 104.

The above described heat exchanger unit is ideally suited for use with the heater system because of its relatively inexpensive construction as well as its effective operation. It will be noted that there is provided a maximum amount of heat transfer area between the cooling water chamber 58 and the exhaust gas passage 67 while the impedance to the exhaust gases is quite small. When the valve head 82 is positioned to close off the heat transfer passage 67, the impedance to the exhaust gas flow is reduced even further because of the straight through passage through the interior of the tubular element 76. During normal operation of the vehicle there is only a very slight resistance to the flow of exhaust gases to the heat exchanger unit, so that it will not affect the operating efficiency of the vehicle engine.

In this heat exchanger, as in the earlier described model, the exhaust gases are passed directly through the unit with a minimum of obstruction under normal operating conditions when no heat transfer is desired. When heat is required during engine warm-ups the exhaust gases are conducted through efficient heat transfer passages wherein the fluid medium extracts heat.

Figure 2:
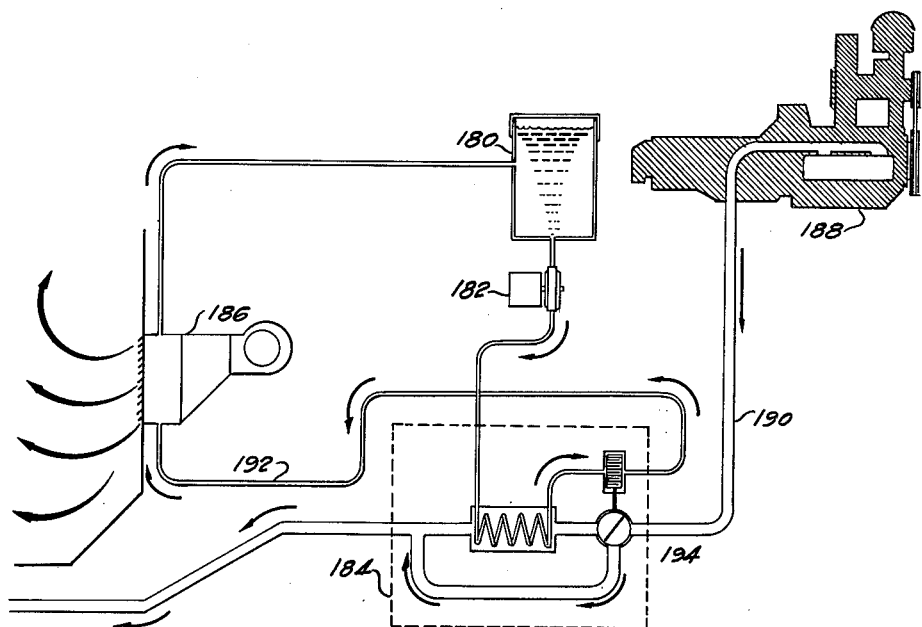
FIG. 2 is a schematic representation of a heating system embodying the principles of this invention as applicable in conjunction with an air cooled engine.

It may be seen in FIG. 2 that the heating system of this invention may also be used as a primary heating system for the passenger compartment of a vehicle having an air cooled engine. In such an installation the cabin radiator system must have its own coolant supply which is stored in a reservoir 180 and circulated by means of a pump 182 through a heat exchanger unit 184 and a cabin heater 186. Heat is provided to the heat exchanger unit 184 by means of the exhaust gases from the engine 188 through the pipe 190. Either type of heat exchanger unit, hereinbefore described, may be used in this system to transfer the heat from the exhaust gases to the heater medium. A hand controlled thermostat 192 adjacent the inlet to the radiator 186 provides operator control of the passenger cabin temperature and is adapted to pass a small portion of heater fluid even at its lowest temperatures in order to provide proper operation of the thermostatically operated valve 194 in the heat exchange unit 184.

The heater systems as described provide an additional advantage in that they are inherently safe. This is because the heat from the exhaust gases is transferred to an intermediate liquid heater medium and then to the air passing therethrough into the vehicle passenger compartment. There is, therefore, no chance of the exhaust gases being transmitted to the passenger compartment upon a rupture in the several fluid passages.

There are numerous other features and advantages in the heater systems and components of this invention which may be readily adapted to other vehicle heaters. While specific embodiments have been described as an example of the teachings of the invention, it is intended that the invention should not be bound thereby, but only by the scope of the appending claim.

What is claimed is:

A heat exchanger comprising a cylindrical housing, a substantially spool-shaped hollow member concentrically disposed within said housing having circumferential end portions in sealing engagement with the inside wall of said housing to form an annular chamber between said spool-shaped member and said housing, a substantially tubular member extending concentrically through said housing and radially spaced from said annular chamber, a spiral baffle in the interstice between the annular chamber and the tubular member, means defining a valve seat around an aperture in the wall of said tubular member adjacent one end thereof, a second tubular member concentrically extending within and spaced from said first tubular member and having one end terminating adjacent said aperture, a flange defining a valve seat across the end of said second tubular member, a valve head, lever means loosely mounting said valve head for positioning said valve head in engagement with either of said valve seats, means for flowing a first fluid through said annular chamber, means for flowing a second fluid into said one end of the first tubular member, means for flowing a second fluid out of said interstice and the other end of said tubular member and thermostatic means connected to said lever means for positioning said valve in engagement with one or the other of said valve seats responsive to the outlet temperature of fluid in said annular chamber.

References Cited by the Examiner
UNITED STATES PATENTS

| | | |
|---|---|---|
| 1,015,145 | 1/1912 | Davis. |
| 1,637,681 | 8/1927 | Clarkson _____ 165—103 |
| 1,706,979 | 3/1929 | Kysor _____ 165—51 |
| 2,268,979 | 1/1942 | Williamson et al. ___ 165—51 X |
| 2,670,933 | 3/1954 | Bay _____ 165—35 |
| 2,914,917 | 12/1959 | Van Nest _____ 165—39 X |
| 3,131,757 | 5/1964 | Bergstrom et al. _____ 165—35 |

CHARLES SUKALO, *Primary Examiner.*